United States Patent
Godsk et al.

(10) Patent No.: US 8,142,162 B2
(45) Date of Patent: Mar. 27, 2012

(54) WIND TURBINE BLADE

(75) Inventors: Kristian Balschmidt Godsk, Copenhagen N. (DK); Thomas S. Bjertrup Nielsen, Randers (DK)

(73) Assignee: Vestas Wind Systems A/S, Aarhus N (DK)

( * ) Notice: Subject to any disclaimer, the term of this patent is extended or adjusted under 35 U.S.C. 154(b) by 586 days.

(21) Appl. No.: 11/988,960

(22) PCT Filed: Jul. 15, 2005

(86) PCT No.: PCT/IB2005/052355
§ 371 (c)(1),
(2), (4) Date: Mar. 6, 2009

(87) PCT Pub. No.: WO2007/010329
PCT Pub. Date: Jan. 25, 2007

(65) Prior Publication Data
US 2009/0202354 A1 Aug. 13, 2009

(51) Int. Cl.
*F03D 1/06* (2006.01)
(52) U.S. Cl. ............ 416/223 R; 416/235; 416/238
(58) Field of Classification Search .......... 244/123.1, 244/7 R, 35 R; 415/191–192; 416/1–2, 223 R–241 R, 235, 238, 228, 97 R, 23, 62; 60/362, 602
See application file for complete search history.

(56) References Cited

U.S. PATENT DOCUMENTS

| | | | |
|---|---|---|---|
| 4,459,083 A | 7/1984 | Bingham | |
| 6,320,273 B1 * | 11/2001 | Nemec | 290/55 |
| 7,293,959 B2 * | 11/2007 | Pedersen et al. | 416/23 |
| 7,927,070 B2 * | 4/2011 | Godsk et al. | 416/62 |
| 2002/0197156 A1 | 12/2002 | Haller | |
| 2003/0086788 A1 | 5/2003 | Chandraker | |
| 2004/0075026 A1 | 4/2004 | Sonoda et al. | |

FOREIGN PATENT DOCUMENTS

| | | |
|---|---|---|
| EP | 0 023 025 A1 | 1/1981 |
| EP | 0 331 603 A2 | 9/1989 |
| EP | 0 675 285 A1 | 10/1995 |
| EP | 1 524 405 A2 | 4/2005 |

OTHER PUBLICATIONS

Int'l Search Report, Mar. 2, 2006.
Int'l Preliminary Report, Dec. 20, 2007.

* cited by examiner

*Primary Examiner* — Dung A. Le
(74) *Attorney, Agent, or Firm* — Wood, Herron & Evans, L.L.P.

(57) ABSTRACT

An aerodynamic profile and a wind turbine comprising a wind turbine blade with reduced sensitivity towards surface irregularities are provided. The invention is mainly directed towards pitch-regulated wind turbines, which are operated at variable rotor speed and have blades longer than about 30 meters.

48 Claims, 7 Drawing Sheets

A)

B)

C)

D)

E)

F)

G)

H)

I)

J)

A)

B)

A)

B)

WIND TURBINE BLADE

TECHNICAL FIELD OF THE INVENTION

The invention relates to a wind turbine comprising a wind turbine blade with a particular aerodynamic profile and airfoil design. More particularly, the invention relates to a wind turbine comprising a wind turbine blade with an aerodynamic profile, which blade has been adjusted to reduce the sensitivity towards surface irregularities of the blade such as dirt, scratches and manufacturing variation.

BACKGROUND OF THE INVENTION

A wind turbine blade cross section is typically referred to as a profile. The blade is connected to the hub that is placed in the rotor centre. The profile has a chord, c, and a thickness, t, as shown in FIG. 1. The shape of the profile, e.g. the sizes of the chord and the thickness as well as the thickness to chord ratio, varies as a function of the radius, r, i.e. the distance from the rotor centre to the blade cross section.

Typically, a wind turbine blade airfoil is formed by interpolation between a plurality of profiles. The blade and hence the individual profiles are rotated relative to the rotor plane during operation. The incoming wind is about orthogonal to the rotor plane, but since the blade is in motion, the effective angle and speed of the incoming wind (i.e. corresponding to a steady blade) depend on the speed of rotation of the blade. The effective angle is also referred to as the angle of attack, $\alpha$, as shown in FIG. 2. The effective wind speed that the profiles experience is also referred to as the relative wind speed, w, as shown in FIG. 2.

A wind turbine blade may be prone to both permanent and temporary surface irregularities during the service life. Temporary surface irregularities may e.g. be bird droppings, insects, dust particles, rain, snow, ice, salt, etc. Permanent irregularities may e.g. originate from temporary surface irregularities, which are not removed, or arise during manufacturing or handling, e.g. via scratches, mould imperfections, paint defects, etc.

Presence of surface irregularities typically results in one or more of reduced lift, increased drag and increased acoustic emission, which changes all are undesired for the application of blades for a modern wind turbine.

A certain number and size of surface irregularities are unavoidable through the service life of a wind turbine blade. There is hence a demand for a wind turbine blade and a profile, for which the aerodynamic properties are less influenced by surface irregularities.

OBJECT OF THE INVENTION

It is the object of the invention to provide an improved aerodynamic profile and a wind turbine blade comprising the profile.

DISCLOSURE OF THE INVENTION

This is realised for by the aerodynamic profile for a wind turbine blade, which profile has a suction side and a pressure side, which sides are connected at the leading edge and the trailing edge. This defines a continuous outer surface of the profile. The profile further has a camber, which deviates from chord line. The leading edge has a rounded shape, and the thickness at 2%-chord, $t_{2\%\ c}$, is $t_{2\%\ c} > 7\%$ of the chord and $t_{2\%\ c} < 9\%$ of the chord. In a preferred embodiment, the thickness at 2%-chord is $t_{2\%\ c} > 7.5\%$ of the chord and $t_{2\%\ c} < 8.5\%$ of the chord.

In another aspect of the invention, an aerodynamic profile according to the invention and suitable for a wind turbine blade has a suction side and a pressure side, which sides are connected at the leading edge and the trailing edge. This defines a continuous outer surface of the profile. The profile further has a camber, which deviates from chord line. The leading edge has a rounded shape, and for at least one position between 50%-chord and 80%-chord of the profile, the slope of the suction side of the profile is between a first linear interpolation between −9% at 50%-chord to −16% at 80%-chord and a second linear interpolation between 4.5% at 50%-chord and −8% at 80%-chord. In a preferred embodiment, one or more parts of the range from 50%-chord to 80%-chord of said profile is between said first linear interpolation and said second linear interpolation, such as a quarter of the range, half of the range or most preferably substantially all of the range.

Another aspect of the invention concerns a wind turbine blade comprising at least one profile according to another aspect of the invention.

A further aspect of the invention concerns a wind turbine comprising a wind turbine blade with at least one profile according to another aspect of the invention.

BRIEF DESCRIPTION OF THE DRAWINGS

The invention will be explained more fully below with reference to exemplary embodiments as well as the drawings, in which.

All the figures are highly schematic and not necessarily to scale, and they show only parts which are necessary in order to elucidate the invention, other parts being omitted or merely suggested.

DETAILED DESCRIPTION

Figure 1:
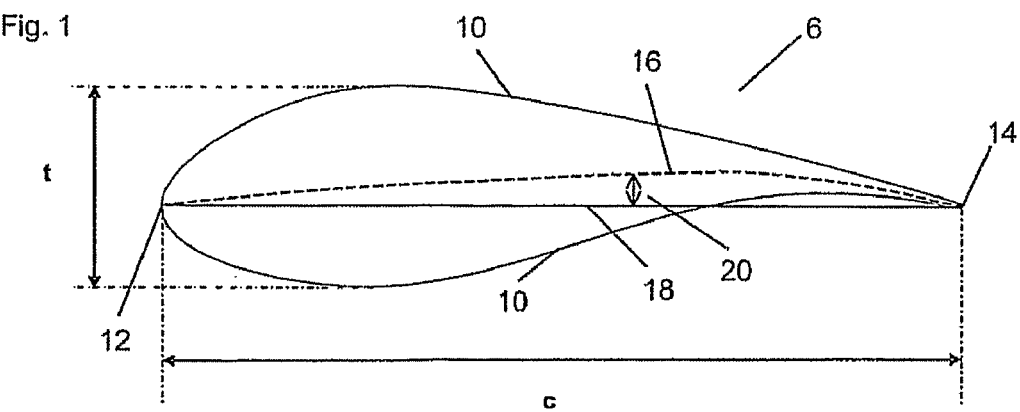
FIG. 1 shows a profile of a wind turbine blade.
Figure 2:
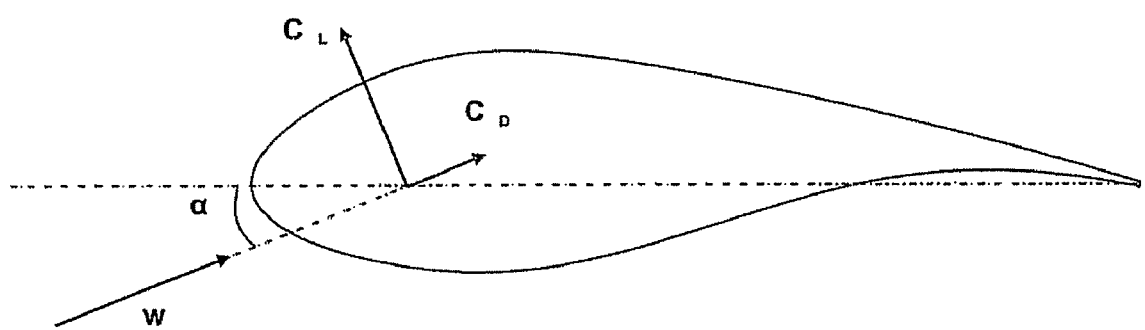
FIG. 2 shows a profile with incoming wind.

An aerodynamic profile 6 as shown in FIG. 1 has a suction side 8 and a pressure side 10 defined according to the incoming wind (see FIG. 2) and the shape of the profile. The front of the profile is designated leading edge 12 and the end of the profile away from the leading edge is designated trailing edge 14.

Definitions

By radius-% is herein meant a fraction of the blade corresponding to the same percentage of the longitudinal length of the blade. The fraction need not be one continuous part but may be made up by several parts of the profile. For example, 50 radius-% corresponds to 25 meters of a blade when the rotor radius is 50 meters, and the 50 radius-% may e.g. be made up by 5 meters of the blade root in combination with the outermost 5 meters of the blade tip and 15 meters around the middle of the blade.

By %-chord is herein meant a distance from the leading edge of the profile. For example, half or 50% of the range between 50%-chord to 80%-chord corresponds to 15% of the total chord length, and the 50% of the range may e.g. be made up by 50%-chord to 55%-chord in combination with 65%-chord to 75%-chord.

Figure 5:
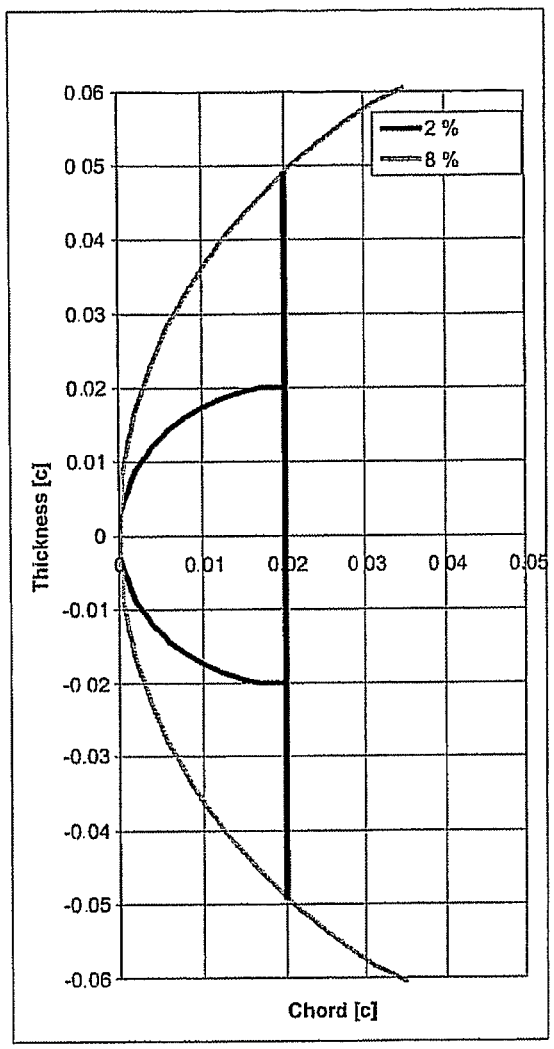
FIG. 5 shows the chord line and the camber line of a profile.
Figure 5:
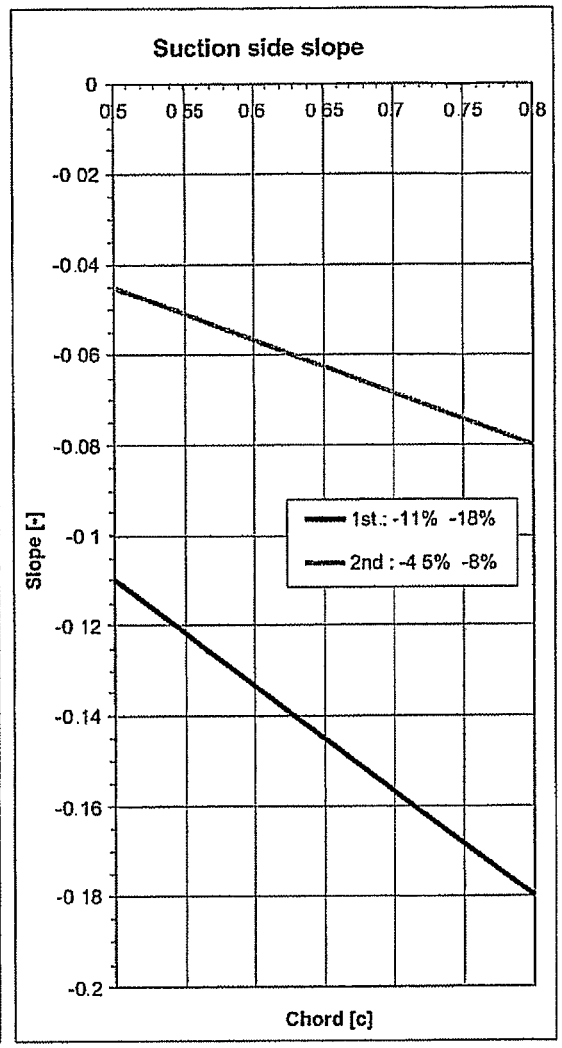

By chord is herein meant the straight line between the leading edge and the trailing edge. Hence, the chord may be situated outside the aerodynamic profile in one or more ranges of %-chord. This is observed in FIG. 5 for an example of a schematic wind turbine profile 6, where the chord line 18 and the camber line 16 are indicated.

By camber line is herein meant a line forming from the leading edge to the trailing edge following the mean co-ordinate of the suction side and the pressure side. Hence, between the leading edge and the trailing edge, the camber line is always situated within the aerodynamic profile. This is also observed in FIG. 5 for an example of a schematic wind turbine profile 6, where the chord line 18 and the camber line 16 are indicated. It should be observed that for high performance wind turbines, such as a wind turbine having at least one blade and having a rotor diameter of more than 60 meters, and particularly for a wind turbine having a rotor diameter of more than 80 meters, it is particularly advantageous to have a profile wherein the chord line deviates from the camber. This is mainly based on the fact that a symmetrical profile (i.e. camber line=chord) cannot—even theoretically—be designed to have a very high lift coefficient, $c_L$, and hence profiles used for larger wind turbine blades have camber line and chord which deviate to achieve high lift, i.e. high $c_L$.

One of the main causes of failure for larger wind turbine blades is fatigue. Fatigue is to a large extent controlled by the size of the chord in that the larger the chord the more the wind turbine blade is prone to fatigue failure. It is therefore highly desirable to utilize aerodynamic profiles with high coefficients of lift combined with relatively short chords, and symmetrical profiles are hence not suitable for large wind turbines.

It should be observed that by a camber of the profile, which camber deviates from chord line, is herein meant that the camber line and the chord line deviate by at least 1.5% of the chord length in the direction orthogonal to the chord line in at least one point between the leading edge and the trailing edge. In a preferred embodiment, the camber line deviates by at least 1.5% of the chord length in the direction orthogonal to the chord line in at least 10% of the range between the leading edge and the trailing edge, more preferably in at least 20% and most preferably in at least 30% of the range. In another preferred embodiment, the camber line deviates at least by at least 3% of the chord length in the direction orthogonal to the chord line in at least one point between the leading edge and the trailing edge. In a further preferred embodiment, the camber line deviates by at least 3% of the chord length in the direction orthogonal to the chord line in at least 10% of the range between the leading edge and the trailing edge, more preferably in at least 20% and most preferably in at least 30% of the range. Profiles with higher deviation between the chord line and the camber line as well as profiles where the deviation is a larger range provide for a more non-symmetrical profile and hence allow for a profile with higher coefficient of lift. In FIG. 1, the deviation between the camber line and the chord line is indicated by arrow 20.

By rounded shape of the leading edge is herein meant that the $1^{st}$ derivative of the distance from the chord line to the suction side as well as the $1^{st}$ derivative of the distance from the chord line to the pressure side as a function of the chord-% is continuous in the leading edge range including the very leading edge to about 5%-chord.

Blunt Leading Edge

It was found that a pressure rise at the leading edge could be controlled by a carefully designed blunt leading edge that insures that the suction side natural transition point, where the flow shift from laminar to turbulent, moves to the very leading edge when the angle of attack approaches the angle of attaches corresponding to maximum lift coefficient $c_{Lmax}$, this angle is also referred to as $\alpha_{max}$. Premature transition caused by irregularities of the leading edge will therefore be eliminated by a very forward position of the natural transition point.

Figure 3:
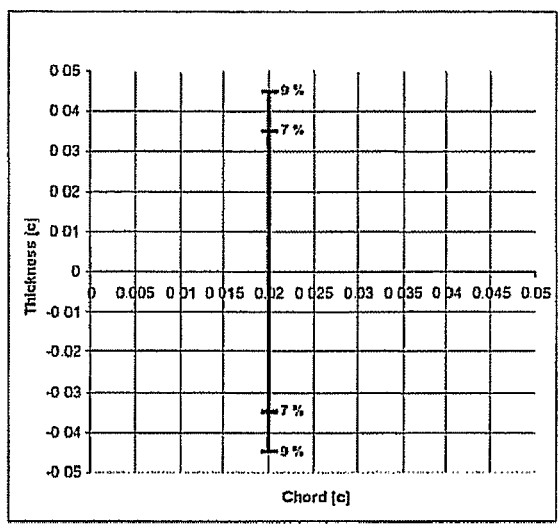
FIG. 3 shows design criterions for a leading edge of a profile.
Figure 3:
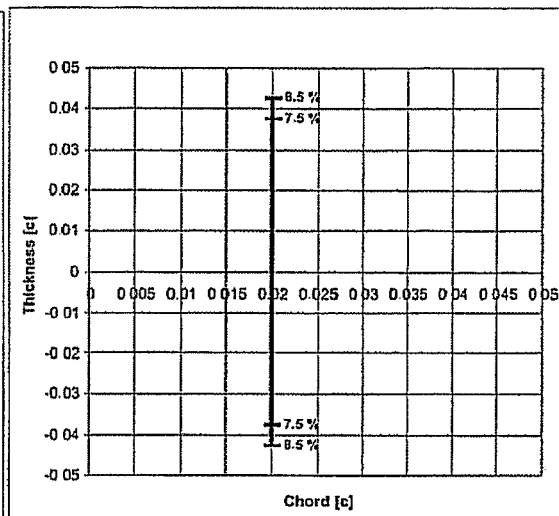
Figure 3:
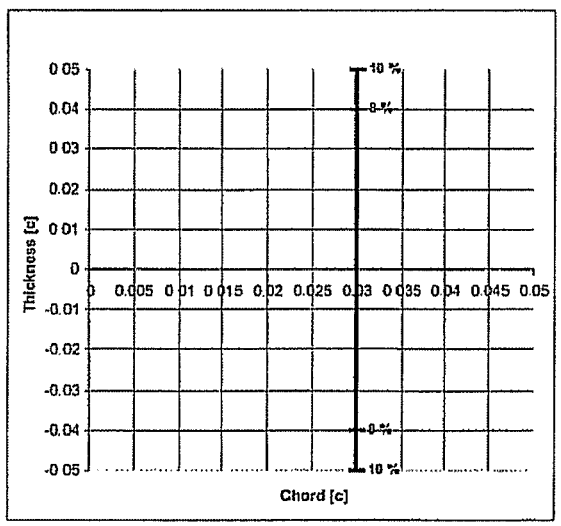
Figure 3:
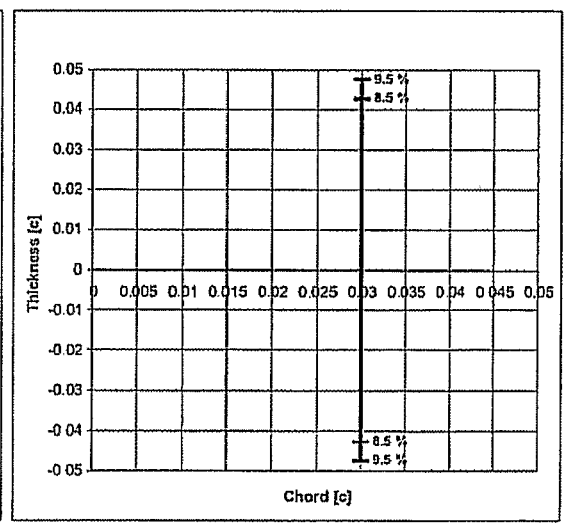
Figure 3:
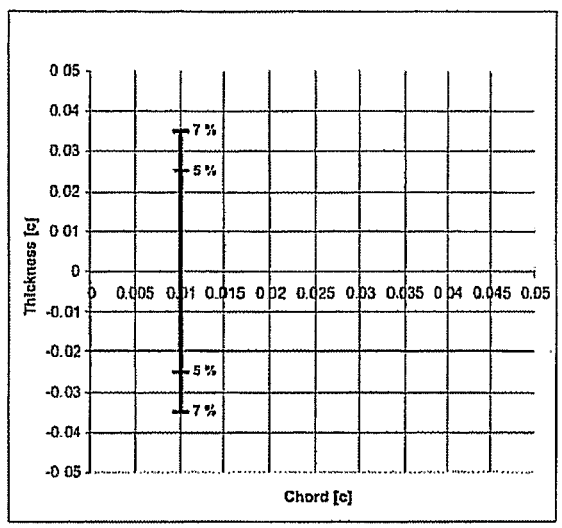
Figure 3:
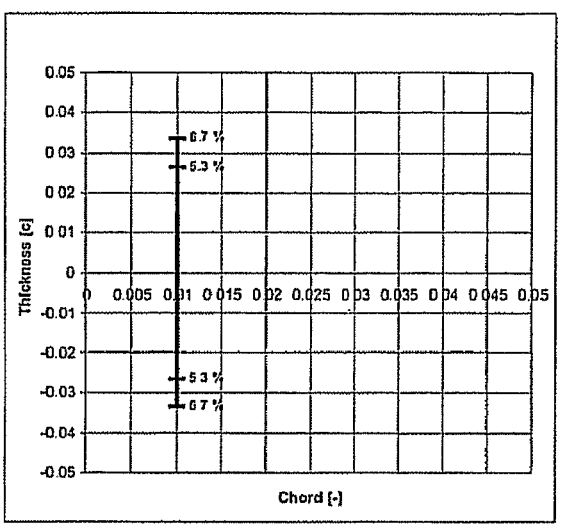
Figure 3:
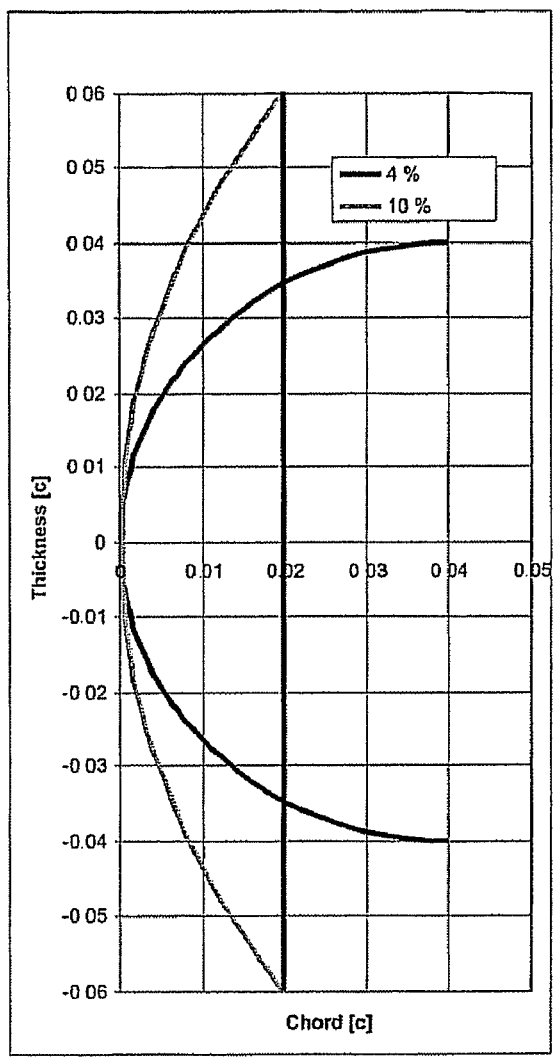
Figure 3:
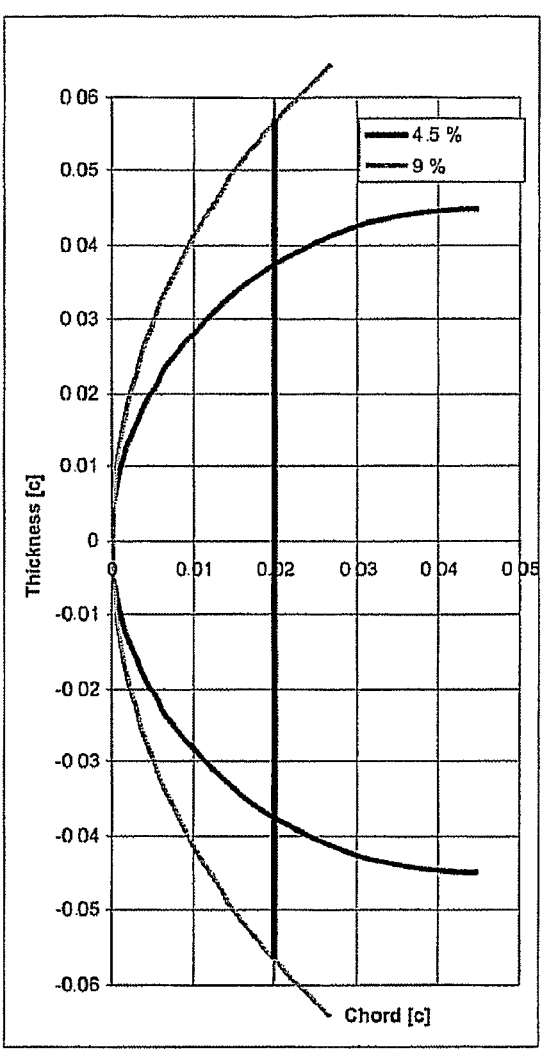
Figure 3:
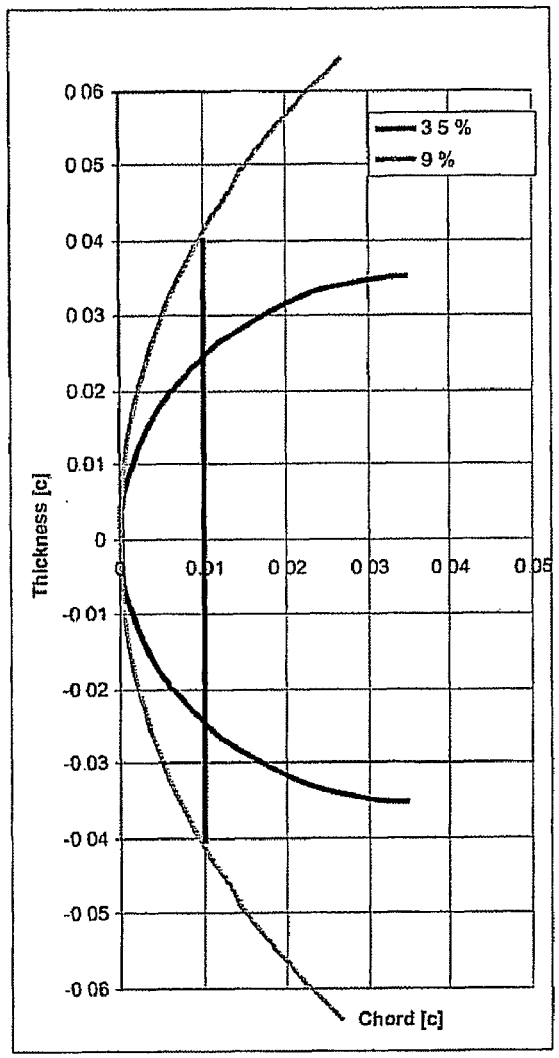
Figure 3:
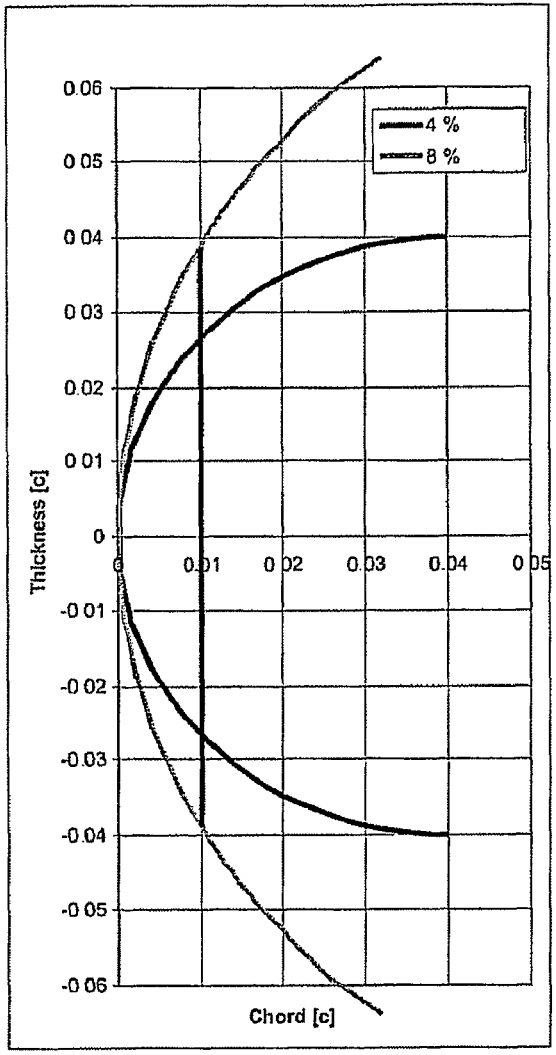

Starting from these design considerations, aerodynamic profiles, which are superior to the previously known profiles with respect to sensitivity towards surface irregularities, were invented. This resulted in that an aerodynamic profile according to the invention has a suction side and a pressure side, which sides are connected at the leading edge and a trailing edge whereby a continuous outer surface of the profile is formed. Furthermore, the camber of the profile deviated from the chord line as discussed above. The leading edge region is rounded so that the slopes of the suction side as well as the pressure side are continuous. Experimental work has shown that for such a profile, it is highly advantageous that the thickness of the profile at 2 chord-% of the leading edge, i.e. the thickness at 0.02 chord away from the very leading edge and also referred to as $t_{2\% C}$, is between 7% to 9% of the chord length. Particularly, the thickness at 2 chord-% being in the range of 7.5% of the chord<$t_{2\% C}$<8.5% of the chord, was found to be advantageous with a very low sensitivity towards surface irregularities. These ranges are indicated in FIGS. 3A and B. It should be observed that the advantageous thickness of the profile at 2 chord-% need not be symmetrical about the chord line. In FIG. 3, the thickness range is drawn symmetrical, i.e. the distances from the chord line to the claimed ranges corresponding to the pressure side and to the suction side are the same. However, it was found—as it is reflected in the claim—that the important feature in this aspect of the invention was the total distance between the pressure side and the suction side and not if the chord line is shifted slightly towards either of the sides.

The experimental work also revealed that a highly advantageous profile may alternatively be defined by having a thickness of the profile at 3 chord-% of the leading edge in the range 8%<$t_{3\% C}$<10% of the chord. Particularly, the range of 8.5%<$t_{3\% C}$<9.5% of the chord, was advantageous with a very low sensitivity towards surface irregularities. An example of such ranges is indicated in FIGS. 3C and D.

Furthermore, the experimental work also revealed that the region very close to the leading edge of a highly advantageous profile may be defined by having a thickness of the profile at 1 chord-% of the leading edge in the range 5%<$t_{1\% C}$<7% of the chord. Particularly, the range of 5.3%<$t_{1\% C}$<6.7% of the chord, was advantageous with a very low sensitivity towards surface irregularities. An example of such ranges is indicated in FIGS. 3E and F.

Alternatively, the relevant shapes of the leading edge may be defined as being within an area between two semi-circles where the profile should be arranged while still taking into account that the profile should have a rounded leading edge. Experimental work has shown that the sensitivity towards surface irregularities is low when the profile between near the leading edge and 2 chord-% of the profile is within a range between radius curvature of 4% of the chord and a radius curvature of 10% of the chord. Since the radius curvatures substantially collapse at the very leading edge, the expression 'near the leading edge' has been introduced. By 'near the leading edge' is here meant about 0.25 chord-%. These ranges are indicated in FIG. 3G. It should be observed that the profile need not correspond to a radius of curvature but merely to be within the range between the radius curvature borders of the range. However, the requirement that the profile should be rounded (see above) obviously also applies. It was found that it is particularly advantageous when the leading edge corresponding to 0.25 chord-% to 2 chord-% of the profile is within a radius curvature of 4.5% of the chord and a radius curvature of 9% of the chord, as this leads to particularly low sensitivity towards surface irregularities. These ranges are indicated in FIG. 3H.

Furthermore, the experimental work also revealed that the region very close to the leading edge of a highly advantageous profile may be defined by having a profile between near the leading edge and 1 chord-% of the profile within a radius curvature of 3.5% of the chord and a radius curvature of 9% of the chord. Since the radius curvatures substantially collapse at the very leading edge, the expression 'near the leading edge' has been introduced. By 'near the leading edge' is here meant about 0.25 chord-%. This allows for a profile with very low sensitivity towards surface irregularities. In a particularly advantageous embodiment, the profile between 0.25 chord-% and 1 chord-% of the profile is within a radius curvature of 4% of the chord and a radius curvature of 8% of the chord. These areas are indicated in FIGS. 3I and J.

Flat 'Back' of Suction Side

It was also found that another important design factor is to carefully shape the airfoil suction side after the thickest point so that the pressure recovery region does not separate prematurely because of an increase of the boundary layer thickness caused by roughness which would reduce $c_{L.max}$.

Figure 4:
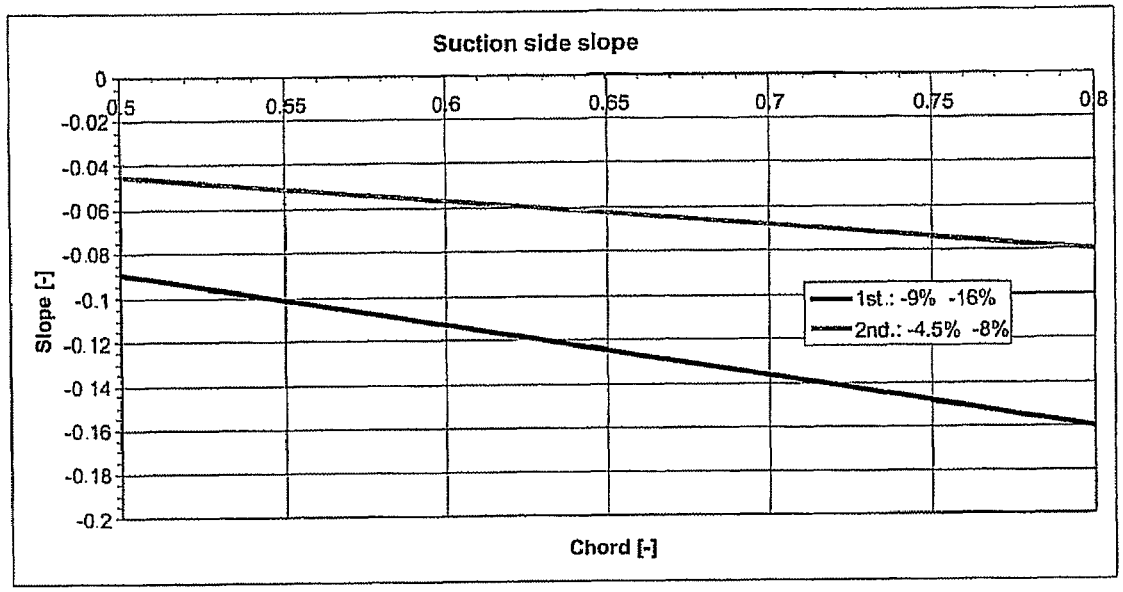
FIG. 4 shows design criterions for a suction side of a profile.
Figure 4:
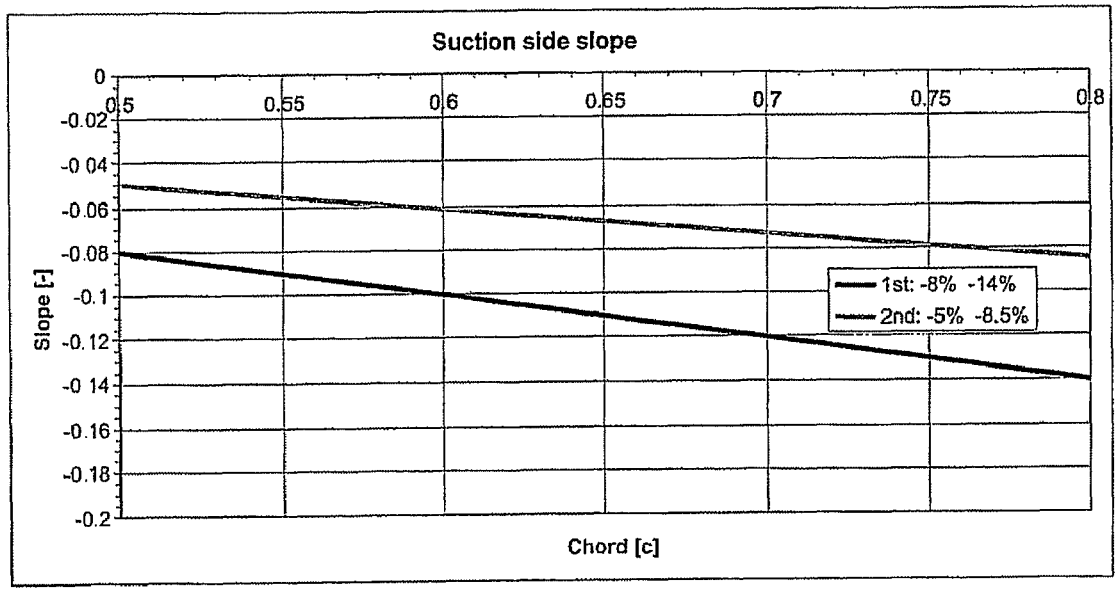

The experimental work surprisingly showed that neither the total thickness nor the thickness of the suction side, i.e. the distance from the chord line to the suction side, but the slope of the suction side is the main parameter with regard to reducing the sensitivity of particularly $c_{L.max}$ towards surface irregularities of the profile. The work concerned an aerodynamic profile according to the invention, the profile having a suction side and a pressure side, which sides are connected at a leading edge and a trailing edge whereby a continuous outer surface of the profile is formed. Furthermore, the camber of the profile deviated from the chord line as discussed above. The leading edge region is rounded so that the slopes of the suction side as well as the pressure side are continuous. Particularly, it was found that in at least one position between 50%-chord and 80%-chord of said profile, the slope of the suction side of the profile is arranged within an area defined by two linear interpolations; the first linear interpolation is defined by a slope of −9% at 50%-chord and a slope of −16% at 80%-chord and a second linear interpolation is defined by a slope of 4.5% at 50%-chord and a slope of −8% at 80%-chord. In FIG. 4A the first and the second linear interpolations are indicated to illustrate the area where one or more of the profiles should be arranged. It was also found that when a larger fraction of pressure side slopes is within the range defined by the first and the second interpolations between 50%-chord to 80%-chord, then the tendency to premature separation is considerably reduced. For example, at least a quarter of the range between 50%-chord to 80%-chord may be between the first and the second interpolation, but having a greater part of suction side within the range, such as half of the range, at least 90% of the range, or—most advantageous—substantially all of the relevant range of the suction side is between the first and the second linear interpolation. The higher percentages of the range substantially prevent premature separation even for relatively high levels of surface irregularities and are hence highly advantageous.

The experimental work also revealed that for a particularly preferred embodiment according to the invention, the first linear interpolation is redefined to a slope of −8% at 50%-chord and a slope of −14% at 80%-chord and a second linear interpolation is redefined by a slope of −5% at 50%-chord and a slope of −8.5% at 80%-chord. In FIG. 4B the redefined first and the second linear interpolations are indicated to illustrate the area where one or more of the profiles should be arranged. In this embodiment, the considerations regarding having a larger fraction of pressure side slopes within the range defined by the first and the second redefined interpolations between 50%-chord to 80%-chord, are also highly advantageous, as the tendency to premature separation is even further reduced.

Combination of Blunt Leading Edge and Flat 'Back' of Suction Side

As discussed previously, both considerations regarding the shape of the very leading edge, i.e. the bluntness of the leading edge, and the considerations regarding the shape of the suction side, i.e. the flatness of the 'back' of the profile, are individually relevant to consider when designing a profile having low sensitivity with regard to surface irregularities. However, surprisingly it was found that by combining the design criterions of the very leading edge with those of the suction side, the sensitivity with regard to surface irregularities is decreased beyond what may be reached by these design criterions individually.

A combined profile may e.g. be defined as:

Aerodynamic profile for a wind turbine blade, said profile having a suction side and a pressure side, which sides are connected at a leading edge and a trailing edge thereby forming a continuous outer surface of the profile, wherein camber of the profile deviates from chord line, the leading edge has a rounded shape, the thickness at 2 chord-% of the leading edge being $t_{2\%\ C}$>7% of the chord and $t_{2\%\ C}$<9% of the chord; preferably $t_2$% C>7.5% of the chord and $t_{2\%\ C}$<8.5% of the chord, and for at least one position between 50%-chord and 80%-chord of said profile the slope of the suction side of the profile is between a first linear interpolation between −9% at 50%-chord to −16% at 80%-chord and a second linear interpolation between −4.5% at 50%-chord and −8% at 80%-chord, preferably at least a quarter of the range 50%-chord to 80%-chord of said profile is between said first linear interpolation and said second linear interpolation, more preferably at least half of the range 50%-chord to 80%-chord of said profile is between said first linear interpolation and said second linear interpolation, even more preferably at least a 90% of the range 50%-chord to 80%-chord of said profile is between said first linear interpolation and said second linear interpolation, and most preferably substantially all of the range 50%-chord to 80%-chord of said profile is between said first linear interpolation and said second linear interpolation.

Based on this example, the skilled person may derive other combinations of claims according to the invention.

Furthermore, it was found that due to the decreased sensitivity towards surface irregularities arising by the combination, the design criterions might be slightly less tight while maintaining low sensitivity towards surface irregularities. A preferred embodiment of this aspect of the invention concerns an aerodynamic profile for a wind turbine blade, wherein the profile having a suction side and a pressure side, which sides are connected at a leading edge and a trailing edge, thereby forming a continuous outer surface of the profile. The profile further has a camber line of the profile deviating from chord line, and the leading edge has a rounded shape. With regard to the leading edge, the profile between near the leading edge and 2 chord-% of the profile is within a range between a radius curvature of 2% of the chord and a radius curvature of 8% of the chord. Since the radius curvatures substantially collapse at the very leading edge, the expression 'near the leading edge' has been introduced. By 'near the leading edge' is here meant about 0.25 chord-%. With regard to the slope of the suction side of the profile, in at least one position between 50%-chord and 80%-chord of said profile, this slope is between a first linear interpolation between −11% at 50%-chord to −18% at 80%-chord and a second linear interpolation between −4.5% at 50%-chord and −8% at 80%-chord. In a preferred embodiment, at least a quarter of the range 50%-chord to 80%-chord of said profile is between said first linear interpolation and said second linear interpolation. In another preferred embodiment, at least half of the range 50%-chord to 80%-chord of said profile is between said first linear interpolation and said second linear interpolation, and more preferably at least a 90% of the range 50%-chord to 80%-chord of said profile is between said first linear interpolation and said second linear interpolation. For the most preferred embodiment, substantially all of the range 50%-chord to 80%-chord of said profile is between said first linear interpolation and said second linear interpolation.

In an alternative embodiment based on the design criterions being slightly less tightly restricted while maintaining low sensitivity towards surface irregularities for the combination of a blunt leading edge with a flat suction side concerns an aerodynamic profile for a wind turbine blade, wherein the profile having a suction side and a pressure side, which sides are connected at a leading edge and a trailing edge, thereby forming a continuous outer surface of the profile. The profile further has a camber line of the profile deviating from chord line, and the leading edge has a rounded shape. With regard to the leading edge, the profile between near the leading edge and 2 chord-% of the profile is within a range between a radius curvature of 4% of the chord and a radius curvature of 10% of the chord. Since the radius curvatures substantially collapse at the very leading edge, the expression 'near the leading edge' has been introduced. By 'near the leading edge' is here meant about 0.25 chord-% With regard to the slope of the suction side of the profile, in at least one position between 50%-chord and 80%-chord of said profile, this slope is between a first linear interpolation between −14% at 50%-chord to −20% at 80%-chord and a second linear interpolation between −6% at 50%-chord and −10% at 80%-chord. In a preferred embodiment, at least a quarter of the range 50%-chord to 80%-chord of said profile is between said first linear interpolation and said second linear interpolation. In another preferred embodiment, at least half of the range 50%-chord to 80%-chord of said profile is between said first linear interpolation and said second linear interpolation, and more preferably at least a 90% of the range 50%-chord to 80%-chord of said profile is between said first linear interpolation and said second linear interpolation. For the most preferred embodiment, substantially all of the range 50%-chord to 80%-chord of said profile is between said first linear interpolation and said second linear interpolation. This design allows for a profile with a higher thickness, which allows for a structurally more acceptable blade by having more space for reinforcement.

Furthermore, it was found that when a blunt leading edge is combined with a flat 'back' of suction side, the thickness to chord range where the design considerations are highly advantageous is increased to any profile thickness below 24% of the chord. Particularly, it was found that for profile thickness above 13% of the chord and less than 24% of the chord, the combination provides superior profiles. Since the sensitivity towards surface irregularities is particularly important to the outer parts of a wind turbine blade corresponding to a low profile thickness, this profile is particularly advantageous for profile thickness between 13% of the chord to 18% of the chord.

Other Aspects

The profiles according to the invention are particularly suitable for the outermost parts of the blade, as the outermost parts are most relevant for a reduction of the sensitivity towards surface irregularities. Firstly, the outer parts of the blade generate most of the energy and therefore a decrease in $c_{L.max}$ in this part of the blade will greatly reduce the energy outcome of the wind turbine. Secondly, the outer part of the blade is more prone to formation of surface irregularities during service life. This is mainly due to the high velocity of the leading edge for the outer parts of the blade during operation. Finally, audio emission is highly dependent on the sensitivity of the blade towards surface irregularities. Typically, high power wind turbine blades are designed to operate near the noise emission limit and hence an increase in noise emission is not acceptable.

The profiles according to the invention therefore advantageously have a profile thickness, t, corresponding to less than 18% of the chord. In a particularly advantageous profile, the thickness of the profile is less than 17% of the chord and more preferably, the thickness of the profile is between 13% of the chord and 16% of the chord.

The advantageous arrangement of the profile according to the invention near the outermost part of the blade is also particularly suitable under the same arguments as discussed previously. In a highly advantageous embodiment of the invention, the profile is arranged in the outermost 25 radius-% of the blade. In another embodiment of the invention, a profile according to the invention is arranged for at least 20 radius-% of the blade. At least 20 radius-% of the blade may advantageously be arranged in the outermost 50% of the blade.

In a particularly advantageous embodiment of a wind turbine blade, the blade comprises a profile according to the invention for at least 40 radius-% of the blade. Due to the particular relevance of the profiles according to the invention to applications in wind turbine blades away from the root section of the blade, it is advantageous that the at least 40 radius-% having the present profile is utilised between blade radius r=30-90% of the rotor radius, R.

When considering the design of the profile according to the invention. It is also advantageous to strive for profiles with low specific solidity. Low radius specific solidity leads to a reduction of fatigue and extreme loads. Furthermore, low specific solidity profiles require very high $c_{L.max}$ to realise a sufficiently high energy efficiency. Therefore low specific solidity profiles are particularly sensitive towards a reduction in $c_{L.max}$, which will arise by the inevitable presence of surface irregularities during service life. It is therefore highly advantageous to combine a low specific solidity profile with a blunt leading edge and/or a flat 'back' of the suction side.

Since the profiles according the invention restrict the shape of the profile and hence increase the demands on the reinforcement with regard to strength and possible arrangement relative to the centre line of the blade, it is highly advantageous to reinforce the blade according to the invention at least partially with carbon fibres, as these fibres are very strong compared to the size and weight and hence allow for a high degree of structural flexibility. The blade may also comprise other types of reinforcement, such as glass fibres, natural fibres, e.g. hemp, etc. However, it is preferred that the main reinforcement fibre in at least one section of the wind turbine blade is carbon fibres. Such carbon fibres are preferably provided as pultruded or belt pressed, cured members, as this allows for a more simple manufacturing process and highly aligned fibres.

A further aspect of the invention relates to a wind turbine comprising a wind turbine blade according to the invention. Such a wind turbine is advantageous in having a more stable performance during the service life and requires less maintenance of the blades. The reduced sensitivity towards surface irregularities means that the lift is more stable over time and that degradation of the performance is substantially prevented or at least considerably reduced.

The profile is particularly suitable for a wind turbine operable by pitch regulation, variable rotor speed and a rotor diameter of at least 60 meters, preferably at least 80 meters, but the profile may also be used for e.g. stall-regulated wind turbines.

Conditions Near the Blade Root

The airfoil at the root section of the blade is mainly dictated by structural considerations. This is acceptable as this section only covers a minor part of the overall power production. This invention is therefore primarily directed towards the outer 40-98 radius-% of the blade and particularly to the outer 50-95 radius-% of the blade, whereas the considerations may in some cases similarly be applied to the root section.

It should be observed that an individual feature or combination of features from an embodiment or an example of the invention described herein, as well as obvious variations thereof, is combinable with or exchangeable for features of the other embodiments described herein, unless the person skilled in the art would immediately realise that the resulting embodiment is not physically feasible.

| TABLE FOR IDENTIFICATION | |
|---|---|
| 6 | Wind turbine profile |
| 8 | Suction side |
| 10 | Pressure side |
| 12 | Leading edge |
| 14 | Trailing edge |
| 16 | Camber line |
| 18 | Chord line |
| 20 | Deviation between the camber line and the chord line |
| 22 | Incoming wind |
| α | Angle of attack |

The invention claimed is:

1. An aerodynamic profile for a wind turbine blade, said profile having a suction side and a pressure side, said suction side and said pressure side being connected at a leading edge and a trailing edge thereby forming a continuous outer surface of the profile, said profile further having a thickness, a camber line, and a chord line, wherein
said camber line of the profile deviates from said chord line,
the leading edge has a rounded shape, and
the thickness at 2 chord-% of the leading edge being $t_{2\%C}>7\%$ of the chord, and $t_{2\%C}<9\%$ of the chord; and the thickness at 3 chord-% of the leading edge being $t_{3\%C}>8\%$ of the chord and $t_{3\%C}<10\%$ of the chord.

2. The aerodynamic profile according to claim 1, wherein the thickness at 1 chord-% of the leading edge is $t_{1\%C}>5\%$ of the chord and $t_{1\%C}>7\%$ of the chord.

3. An aerodynamic profile for a wind turbine blade, said profile having a suction side and a pressure side, said suction side and said pressure side being connected at a leading edge and a trailing edge, thereby forming a continuous outer surface of the profile, said profile further having a thickness, a camber line, and a chord line, wherein
said camber line of the profile deviates from said chord line,
the leading edge has a rounded shape, and
the profile between 0.25 chord-% and 2 chord-% of the profile is within a range between a radius curvature of 4% of the chord and a radius curvature of 10% of the chord.

4. An aerodynamic profile for a wind turbine blade, said profile having a suction side and a pressure side, said suction side and said pressure side being connected at a leading edge and a trailing edge, thereby forming a continuous outer surface of the profile, said profile further having a thickness, a camber line, and a chord line, wherein
said camber line of the profile deviates from said chord line,
the leading edge has a rounded shape, and
the profile between 0.25 chord-% and 1 chord-% of the profile is within a range between a radius curvature of 3.5% of the chord and a radius curvature of 9% of the chord.

5. An aerodynamic profile for a wind turbine blade, said profile having a suction side and a pressure side, said suction side and said pressure side being connected at a leading edge and a trailing edge, thereby forming a continuous outer surface of the profile, said profile further having a thickness, a camber line, and a chord line, wherein
said camber line of the profile deviates from said chord line,
the leading edge has a rounded shape, and
for at least one position between 50%-chord and 80%-chord of said profile the slope of the suction side of the profile is between a first linear interpolation between −9% at 50%-chord to −16% at 80%-chord and a second linear interpolation between −4.5% at 50%-chord and −8% at 80%-chord.

6. An aerodynamic profile for a wind turbine blade, said profile having a suction side and a pressure side, said suction side and said pressure side being connected at a leading edge and a trailing edge thereby forming a continuous outer surface of the profile, said profile further having a thickness, a camber line, and a chord line, wherein
said camber line of the profile deviates from said chord line,
the leading edge has a rounded shape, and
for at least one position between 50%-chord and 80%-chord of said profile the slope of the suction side of the profile is between a first linear interpolation between −8% at 50%-chord to −14% at 80%-chord and a second linear interpolation between −5% at 50%-chord and −8.5% at 80%-chord.

7. The aerodynamic profile according to claim 1, wherein the profile thickness is less than 18% of the chord.

8. An aerodynamic profile for a wind turbine blade, said profile having a suction side and a pressure side, said suction side and said pressure side being connected at a leading edge and a trailing edge thereby forming a continuous outer surface of the profile, said profile further having a thickness, a camber line, and a chord line, wherein
said camber line of the profile deviates from said chord line,
the leading edge has a rounded shape, the profile between 0.25 chord-% and 2 chord-% of the profile is within a range between a radius curvature of 2% of the chord and a radius curvature of 8% of the chord, and for at least one position between 50%-chord and 80%-chord of said profile the slope of the suction side of the profile is between a first linear interpolation between −11% at 50%-chord to −18% at 80%-chord and a second linear interpolation between −4.5% at 50%-chord and −8% at 80%-chord.

9. An aerodynamic profile for a wind turbine blade, said profile having a suction side and a pressure side, said suction side and said pressure side being connected at a leading edge and a trailing edge thereby forming a continuous outer surface of the profile, said profile further having a thickness, a camber line, and a chord line, wherein said camber line of the profile deviates from said chord line, the leading edge has a rounded shape, the profile between 0.25 chord-% and 2 chord-% of the profile is within a range between a radius curvature of 4% of the chord and a radius curvature of 10% of the chord, and for at least one position between 50%-chord and 80%-chord of said profile the slope of the suction side of the profile is between a first linear interpolation between −14% at 50%-chord to −20% at 80%-chord and a second linear interpolation between −6% at 50%-chord and −10% at 80%-chord.

10. The aerodynamic profile according to claim 8, wherein the profile thickness is less than 24% of the chord.

11. A wind turbine blade comprising a profile according to claim 1, wherein the profile is arranged in the outer 25 radius-% of the blade.

12. A wind turbine blade comprising a profile according to claim 1 for at least 20 radius-% of the blade.

13. A wind turbine blade comprising a profile according to claim 1 for at least 40 radius-% of the blade.

14. The wind turbine blade according to claim 11 further having a low radius specific solidity.

15. The wind turbine blade according to claim 11, wherein said wind turbine blade comprises carbon fibres.

16. The wind turbine blade according to claim 15, wherein carbon fibres are the main reinforcement fibres in at least one section of the wind turbine blade.

17. The wind turbine blade according to claim 15, wherein the carbon fibres are provided as pultruded or belt pressed cured members.

18. A wind turbine comprising a wind turbine blade according to claim 11.

19. Use of an aerodynamic profile according to claim 1 for a wind turbine having reduced sensitivity towards surface irregularities.

20. Use of an aerodynamic profile according to claim 1 for a wind turbine with blades having a low radius specific solidity.

21. Use of an aerodynamic profile according to claim 1 for a wind turbine operable by pitch regulation, variable rotor speed and having a rotor diameter of at least 60 meters, preferably at least 80 meters.

22. The aerodynamic profile according to claim 1, wherein the thickness at 2 chord-% of the leading edge being $t_{2\%C}>7.5\%$ of the chord and $t_{2\%C}<8.5\%$ of the chord.

23. The aerodynamic profile according to claim 1, wherein the thickness at 3 chord-% of the leading edge being $t_{3\%C}>8.5\%$ of the chord and $t_{3\%C}<9.5\%$ of the chord.

24. The aerodynamic profile according to claim 2, wherein the thickness at 1 chord-% of the leading edge being $t_{1\%C}>5.3\%$ of the chord and $t_{1\%C}<6.7\%$ of the chord.

25. The aerodynamic profile according to claim 3, wherein the profile between 0.25 chord-% and 2 chord-% of the profile is within a radius curvature of 4.5% of the chord and a radius curvature of 9% of the chord.

26. The aerodynamic profile according to claim 4, wherein the profile between 0.25 chord-% and 1 chord-% of the profile is between a radius curvature of 4% of the chord and a radius curvature of 8% of the chord.

27. The aerodynamic profile according to claim 5, wherein at least a quarter of the range 50%-chord to 80%-chord of said profile is between said first linear interpolation and said second linear interpolation.

28. The aerodynamic profile according to claim 5, wherein at least half of the range 50%-chord to 80%-chord of said profile is between said first linear interpolation and said second linear interpolation.

29. The aerodynamic profile according to claim 5, wherein at least 90% of the range 50%-chord to 80%-chord of said profile is between said first linear interpolation and said second linear interpolation.

30. The aerodynamic profile according to claim 5, wherein substantially all of the range 50%-chord to 80%-chord of said profile is between said first linear interpolation and said second linear interpolation.

31. The aerodynamic profile according to claim 6, wherein at least a quarter of the range 50%-chord to 80%-chord of said profile is between said first linear interpolation and said second linear interpolation.

32. The aerodynamic profile according to claim 6, wherein at least half of the range 50%-chord to 80%-chord of said profile is between said first linear interpolation and said second linear interpolation.

33. The aerodynamic profile according to claim 6, wherein at least 90% of the range 50%-chord to 80%-chord of said profile is between said first linear interpolation and said second linear interpolation.

34. The aerodynamic profile according to claim 6, wherein substantially all of the range 50%-chord to 80%-chord of said profile is between said first linear interpolation and said second linear interpolation.

35. The aerodynamic profile according to claim 7, wherein the profile thickness is below 17% of the chord.

36. The aerodynamic profile according to claim 7, wherein the profile thickness is between 13% of the chord and 16% of the chord.

37. The aerodynamic profile according to claim 8, wherein at least a quarter of the range 50%-chord to 80%-chord of said profile is between said first linear interpolation and said second linear interpolation.

38. The aerodynamic profile according to claim 8, wherein at least half of the range 50%-chord to 80%-chord of said profile is between said first linear interpolation and said second linear interpolation.

39. The aerodynamic profile according to claim 8, wherein at least a 90% of the range 50%-chord to 80%-chord of said profile is between said first linear interpolation and said second linear interpolation.

40. The aerodynamic profile according to claim 8, wherein substantially all of the range 50%-chord to 80%-chord of said profile is between said first linear interpolation and said second linear interpolation.

41. The aerodynamic profile according to claim 9, wherein at least a quarter of the range 50%-chord to 80%-chord of said profile is between said first linear interpolation and said second linear interpolation.

42. The aerodynamic profile according to claim 9, wherein at least half of the range 50%-chord to 80%-chord of said profile is between said first linear interpolation and said second linear interpolation.

43. The aerodynamic profile according to claim 9, wherein at least a 90% of the range 50%-chord to 80%-chord of said profile is between said first linear interpolation and said second linear interpolation.

44. The aerodynamic profile according to claim 9, wherein substantially all of the range 50%-chord to 80%-chord of said profile is between said first linear interpolation and said second linear interpolation.

45. The aerodynamic profile according to claim 10, wherein the profile thickness is more than 13% of the chord and less than 24% of the chord.

46. The aerodynamic profile according to claim 10, wherein the profile thickness is more than 13% of the chord and less than 18% of the chord.

47. The wind turbine blade of claim 12, wherein at least 20 radius-% having said profile is arranged in the outermost 50 radius-% of the blade.

48. The wind turbine blade of claim 13, wherein at least 40 radius-% having said profile is utilised between blade radius r=30-90% of the rotor radius R.

* * * * *

UNITED STATES PATENT AND TRADEMARK OFFICE
CERTIFICATE OF CORRECTION

| | |
|---|---|
| PATENT NO. | : 8,142,162 B2 |
| APPLICATION NO. | : 11/988960 |
| DATED | : March 27, 2012 |
| INVENTOR(S) | : Kristian Balschmidt Godsk et al. |

It is certified that error appears in the above-identified patent and that said Letters Patent is hereby corrected as shown below:

Column 3

Line 48, delete the first occurrence of "at least".

Column 6

Line 37, change "$t_2\%C$" to --$t_{2\%C}$--.
Line 51, delete "a".

Column 7

Line 23, delete "a".
Line 57, delete "a".

Column 8

Line 51, change "invention. It" to --invention, it--.
Line 61, after "according" insert --to--.

Column 9

Claim 2, line 67, change "$t_{1\%C}>7\%$" to --$t_{1\%C}<7\%$--.

Signed and Sealed this
Thirty-first Day of July, 2012

David J. Kappos
*Director of the United States Patent and Trademark Office*

CERTIFICATE OF CORRECTION (continued)
U.S. Pat. No. 8,142,162 B2

Column 12

Claim 39, line 58, delete "a".

Column 13

Claim 43, line 10, delete "a".